Figure 1:
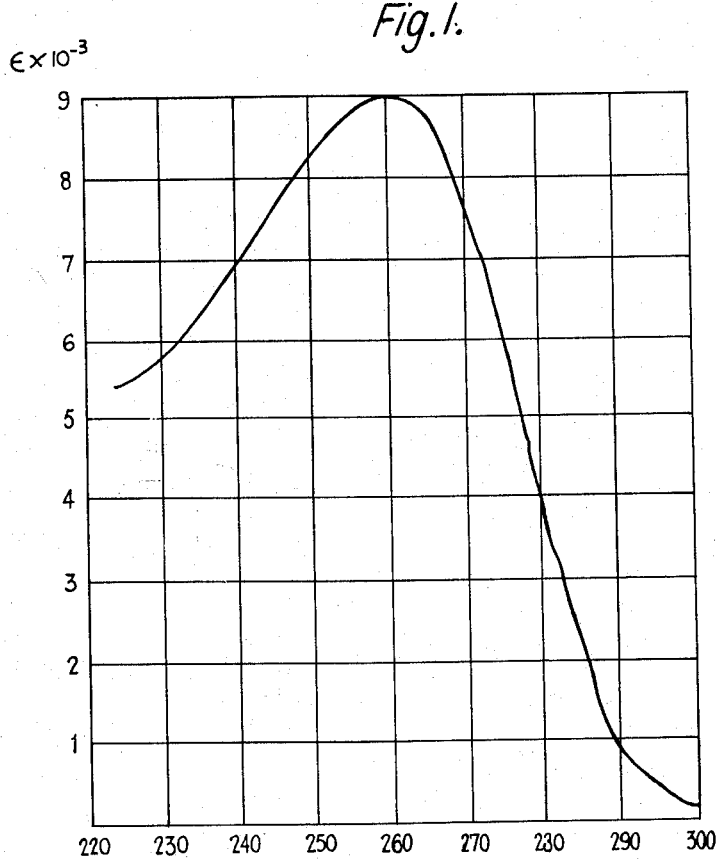

Inventors
EDWARD P. ABRAHAM
& GUY G. F. NEWTON

United States Patent Office 3,093,638
Patented June 11, 1963

3,093,638
CEPHALOSPORIN C
Edward Penley Abraham and Guy Geoffrey Frederick Newton, Oxford, England, assignors to National Research Development Corporation, London, England, a British body corporate
Filed Feb. 1, 1956, Ser. No. 562,891
Claims priority, application Great Britain Feb. 2, 1955
13 Claims. (Cl. 260—243)

It has already been shown that when a nutrient medium is fermented with a mould of the species of which Cephalosporium I.M.I. 49,137 (American Type Culture Collection No. 11,550) is a member, the medium acquires an antibiotic activity. The isolation of two different antibiotics from the medium has already been described in detail. One of these antibiotics is active mainly against gram positive bacteria and is known as Cephalosporin P. The other, known as Cephalosporin N, is a penicillinase-sensitive material which is active against both gram negative and gram positive bacteria.

In co-pending U.S. application Serial No. 396,742, filed December 12, 1953, now Patent No. 2,883,328, granted April 21, 1959 (British patent application No. 31,589/52), there is described a fermentation process for the production of Cephalosporin N and methods by which Cephalosporin N can be obtained in a highly purified form.

The present invention is based upon the observation that crude preparations of Cephalosporin N, when maintained at a pH value such that the Cephalosporin N is converted to Cephalosporin N penillic acid, e.g. from pH 2.5 to 5.5, yield a mixture of Cephalosporin N penillic acid with a hitherto-unknown antibiotic material. This third antibiotic material, which is now termed Cephalosporin C is, like Cephalosporin N, active against both gram positive and gram negative bacteria but is, unlike Cephalosporin N, insensitive to penicillinase prepared from *B. subtilis*. It is soluble in water and almost insoluble in ethanol and ether. It may be recognised from its ultraviolet absorption spectrum which, with the antibiotic in the form of an aqueous solution of its sodium salt having a specific rotation of $[\alpha]_D^{20}$ +103°, shows an ultra-violet absorption maximum at 260 millimicrons.

The present invention therefore provides an antibiotic material, hereinafter referred to as Cephalosporin C, obtainable in admixture with Cephalosporin N penillic acid on maintaining a crude preparation of Cephalosporin N at a pH value such that the Cephalosporin N is converted to Cephalosporin N penillic acid, said antibiotic substance Cephalosporin C having an activity against both gram negative and gram positive bacteria, being stable at pH 2.5 to 5, being soluble in water and almost insoluble in ethanol and ether and exhibiting, when in the form of an aqueous solution of its sodium salt, a specific rotation $[\alpha]_D^{20}$ +103° and an ultra-violet absorption maximum at 260 millimicrons.

In the said co-pending U.S. application Serial No. 396,742, filed December 12, 1953, now Patent No. 2,883,328, granted April 21, 1959 (British patent application No. 31,589/52), one of the processes for the purification of Cephalosporin N involves removing the mycelium from the fermentation liquid, contacting the liquid with activated charcoal, eluting adsorbed material from the charcoal, contacting the eluent with alumina, and eluting adsorbed antibiotic material from the alumina. It is found that Cephalosporin C is present together with the Cephalosporin N in the eluent obtained from the alumina. The eluent therefore represents a potential source for the Cephalosporin C. Other sources of Cephalosporin C are represented by the fermentation liquor itself or crude preparations of Cephalosporin N obtained at the other stage of purification by the said process or obtained at appropriate stages in other processes of purification. Those skilled in the art will have no difficulty in determining to what stage of purification, by any given process, Cephalosporin N can be taken without eliminating the Cephalosporin C therefrom. A crude preparation of Cephalosporin N may, for example, be subjected to the action of a suitable preparation of penicillinase or maintained at a pH of from 2.5 to 5 and then tested for residual activity against appropriate bacteria, for example *B. coli*.

Cephalosporin C is acidic in character. Both the free acid and its sodium salt are readily soluble in water, but insoluble in acetone or ether. An aqueous solution of the sodium salt $[\alpha]_D^{20}$ +103° shows an absorption at 260 mμ with $$E_{1\,cm.}^{1\%} = 200$$

Cephalosporin C contains carbon, hydrogen, oxygen, nitrogen and sulphur, but no halogen or phosphorus. Elementary analyses of the sodium salt and the free acid respectively have given the following results:

*Sodium salt.*—Found: C, 39.5, 40.0; H, 4.8, 5.2; N, 8.9; S, 6.2; Na, 4.9%. Equi. (titration) 480±15. M. wt. determined by X-ray crystallographic analysis 470±15. $C_{16}H_{20}O_8N_3SNa$, $2H_2O$ requires C, 40.5; H, 5.1; N, 8.9; S, 6.7; Na, 4.9% M. wt. 473.

*Free acid.*—Found: C, 44.44; H, 5.6; N, 9.8; S, 7.3%. $C_{16}H_{21}O_8N_3S.H_2O$ requires C, 44.5; H, 5.3; N, 9.7; S, 7.4%.

The analytical FIGURES suggest the Cephalosporin C may have the molecular formula $C_{16}H_{21}O_8N_3S$. However, this formula is only tentative and may subsequently need revision.

Cephalosporin C gives a ninhydrin reaction. Electrometric titration indicates that it is a monoaminodicarboxylic acid, having two acid groups with pH values of less than 2.6 and of 3.1 and a basic group with a pK value of 9.8. When subjected to ionophoresis on paper in a collidine-acetate buffer at pH 7, it migrates towards the anode at almost the same rate as Cephalosporin N.

The infra-red spectrum of Cephalosporin C sodium salt (in paraffin paste) shows bands at the following wavelengths: 2.94μ, 3.06μ (NH), 5.77μ (ester or lactone grouping, 6.05μ and 6.57μ (C=O of monosubstituted amide), 6.29μ (—COO—), 7.17μ and 7.36μ (isopropyl) group). The statements in parenthesis are possible interpretations. Cephalosporin C sodium salt also shows a band at 5.61μ. A band in this region is shown by Cephalosporin N and by sodium benzyl penicillin and has been attributed in the latter compound, to the C=O of the fused β-lactam thiazolidine ring system (Thompson, Brattain, Randall and Rasmussen, The Chemistry of Penicillin, chapter 13, Princeton University Press, 1949).

Unlike Cephalosporin N and benzylpenicillin, Cephalosporin C is stable in aqueous solution at pH 2.5. It is rapidly inactivated however, at pH 12. After keeping at pH 12 for two hours, back titration showed that two acidic groups per mole had been formed. Under similar conditions only one acidic group per mole is liberated from Cephalosporin N and from benzylpenicillin. Cephalosporin C is more stable in the presence of certain heavy metal ions, such as $Cu^{++}$, $Pb^{++}$ and $Zn^{++}$, than is Cephalosporin N or benzylpenicillin.

On hydrolysis with acid (N—HCl for 8 hours at 110° C.), Cephalosporin C, like Cephalosporin N, yields carbon dioxide and an acid amino acid which behaves like α-aminoadipic acid on paper chromatograms. The product obtained by allowing Cephalosporin C to react with 1:2:4-fluorodinitrobenzene yields a product on hydrolysis which behaves like the dinitrophenyl derivative of α-aminoadipic acid. It, therefore, appears that the α-amino group of α-aminoadipic acid is free in Cephalosporin C and that (since this amino group shows a pK value of 9.8) the α-carboxyl group is also free.

No evidence has been obtained of the formation of a substantial amount of penicillamine (β-thiolvaline) on hydrolysis of Cephalosporin C, but hydrolysis of the product obtained from it by hydrogenolysis, with Raney nickel, yielded amino acids which behaved like α-aminoadipic acid and valine respectively on paper chromatograms.

Cephalosporin C shows an activity of the same order of magnitude against a number of gram positive and gram negative bacteria. It is less effective than Cephalosporin N against *Staph. aureus* and *Salm. typhi*, in vitro, showing an activity of 8-10 units per mcg. (the unit being that referred to by Abraham, Newton and Hale, 1954. Biochem. J. 58, 94). It has an activity similar to that of Cephalosporin N against a strain of *Bact. coli*.

Its toxicity has not yet been evaluated by full biological assay, but is believed to be low since mice can be given at least 10 mg. of the purified material intravenously without appearing to suffer ill-effects.

Cephalosporin C can be separated from a mixture thereof with Cephalosporin N in accordance with the present invention by subjecting the mixture to partition between two solvents, each of which is capable of dissolving both Cephalosporin N and Cephalosporin C. Any convenient solvent system can be employed wherein the partition coefficient is favourable at pH values where the two antibiotics are stable. Cephalosporin N is unstable at pH values below 5, whereas Cephalosporin C is stable even at a pH value of as low as 2.5. If, therefore, the activity of the Cephalosporin N can be sacrificed, partition may be effected at pH values at which the Cephalosporin C alone is stable. A convenient solvent system is the phenol-water system described in copending U.S. application Serial No. 396,742, filed December 12, 1953 (British patent application No. 31,589/52). In this system, one phase is represented by a phenol-rich layer while the other phase is represented by a water-rich layer. At pH 2.5, the ratio of concentration in the water-rich phase to concentration in the phenol-rich phase (K) is for Cephalosporin N about 0.35 and for Cephalosporin C about 0.2. At pH 6, both antibiotics are present almost entirely in the water-rich phase. It is found, however, that the partition coefficient of a phenol-water system can be rendered sufficiently different for practical purposes at pH values where both antibiotics are stable, i.e. values greater than 5 by adding thereto a small amount, e.g. from 1 to 10%, of an organic tertiary base, for example dimethylaniline, pyridine, a lutidine or a collidine.

Similar effects are obtainable not only with phenol itself but with simple alkyl-substituted phenols, such as the cresols and xylenols.

The separation of the two antibiotics by solvent fractionation is a tedious process involving a considerable number of stages. Where, however, it is not required to retain the Cephalosporin N in active form, the separation of Cephalosporin C may be effected in a far more simple manner by converting the Cephalosporin N in the mixture to Cephalosporin N penillic acid and treating the resulting mixture to separate the Cephalosporin C therefrom, for example, by solvent fractionation, by fractional adsorption on a solid adsorbent, such as alumina or an anion exchange material, by converting the penillic acid to an insoluble derivative or by a combination of these methods. The most convenient manner of converting the Cephalosporin N to its penillic acid is to maintain the mixture at a pH at which the Cephalosporin N is unstable. Thus the conversion may be effected simply by maintaining the mixture for 2 hours at pH 3 and at a temperature of 37° C.

The following procedures for separating Cephalosporin C from Cephalosporin N penillic acid have been found to produce good results.

(1) An aqueous solution of the mixture is added to a column of an anion exchange resin, such as "Amberlite IR4B (XE–59)" (the word "Amberlite" is a registered trademark) and elution is effected with a dilute acid, a suitable buffer solution such as aqueous ammonium formate or ammonium acetate of pH between 3.2 and 5.0, or an aqueous solution of a tertiary base, such as pyridine, partly neutralized with acetic acid, sulphuric acid or oxalic acid. A band consisting of Cephalosporin N penillic acid emerges from the column before a band consisting of Cephalosporin C.

(2) An aqueous solution of the mixture is subjected in a distribution machine to counter-current distribution under weakly acid conditions in a two-phase solvent system obtained from water and phenol (or a suitable substituted phenol such as cresol or a xylenol). If desired, the partition coefficients in the system may be modified by the addition of a suitable amount of an organic solvent, for example carbon tetrachloride. The pH of the system is brought to a pH of from 2 to 5 by the addition of acetic acid or of ammonium acetate or ammonium formate buffer. Transfers are made until Cephalosporin C and Cephalosporin N penillic acid have formed separate bands. Conditions are preferably arranged so that Cephalosporin C is withdrawn from the machine in the aqueous phase.

(3) An aqueous solution of the mixture is added to a column of acid-washed alumina and elution effected with a dilute aqueous alkali, such as 0.01 N-sodium hydroxide. Cephalosporin C emerges from the column, as a solution of its sodium salt, before Cephalosporin N penillic acid.

(4) An aqueous solution of mercuric chloride is added to a solution containing a crude mixture of Cephalosporin C and Cephalosporin N penillic acid, the latter compound is converted to a penillamine which is precipitated as a mercaptide. The supernatant solution contains crude Cephalosporin C.

The present invention also provides a process which enables both Cephalosporin N and Cephalosporin C to be obtained in the active condition and which is less tedious than the solvent fractionation process, the process being based upon two discoveries, i.e.

(a) That when a mixture of the two antibiotics is eluted from an anion exchange material with a buffer solution of pH 4.5 to 5.5, both antibiotics are eluted in an active state, the Cephalosporin N tending to be eluted first;

(b) That when the said buffer solution consists of an aqueous solution of a weak tertiary base and sulphuric acid or oxalic acid, the two antibiotics are readily recoverable from the eluate under conditions which result in substantially no loss of activity.

According to an important feature of the present invention there is provided a process for the treatment of an aqueous solution containing both Cephalosporin C and Cephalosporin N to produce a fraction in which the ratio of Cephalosporin C to Cephalosporin N is greater than in said aqueous solution and a fraction in which the ratio of Cephalosporin C to Cephalosporin N is less than in said aqueous solution which process comprises contacting said aqueous solution with an anion exchange material at a pH of at least 4.9, progressively eluting the anion exchange material with an aqueous buffer at the same pH, e.g. between 4.9 and 8.0, preferably with an aqueous solution of sulphuric acid or oxalic acid containing sufficient of a tertiary base soluble therein to produce a pH of from 4.9 to 5.5, and collecting separately a portion of the eluate in which the ratio of Cephalosporin C to Cephalosporin N is less than in said aqueous solution and a portion of the eluate in which the ratio of Cephalosporin C to Cephalosporin N is greater than in said aqueous solution. It will be appreciated that at pH values below 4.9 there is an increasing likelihood of the Cephalosporin N becoming de-activated because of its instability towards acids whilst, above pH 8, Cephalosporin C tends to become de-activated and at pH 11 it is completely de-activated. In the lower pH range, de-activation of Cephalosporin N can be retarded by operating at low temperatures so that it would be possible to operate below a pH of 4.9 by keeping the temperature below about 7° or 8° C. but there would then be some unavoidable loss of Cephalosporin N.

The eluent used in eluting the anion exchange column is preferably a solution of sulphuric acid or oxalic acid containing sufficient of a weak tertiary base which is soluble in that solution to produce a pH of from 4.9 to 5.5. The precise character of the tertiary base is unimportant. Obviously, as the solution is required to be buffered, one must employ a base which is sufficiently weak for use in the required range of pH. A factor which should be taken into consideration when selecting a base is that the base should be capable of ready elimination from the antibiotics when obtaining them in a more purified form in later stages of the process.

A convenient means of eliminating the base is by evaporation. As antibiotics in general tend to be thermolabile, it is advantageous to employ a base which is volatile at relatively low temperatures under such degrees of vacuum as are convenient on the commercial scale. In practice, pyridine is suitable in this respect. Collidine and lutidine have also been used as bases, however, and removed by extraction into an organic solvent, such as benzene.

The two products produced by the preferred process, i.e. an eluent containing predominantly Cephalosporin N, and an eluent containing predominantly Cephalosporin C, both contain oxalic acid or sulphuric acid. While the presence of these acids during later stages of purification is not necessarily objectionable, their very nature renders them relatively simple to eliminate. They both form insoluble salts with the alkaline earth metals and according to a feature of the invention they may therefore be precipitated from the eluate in the presence of an alkaline earth metal hydroxide, preferably barium hydroxide.

Treatment with excess alkaline earth metal hydroxide to remove the oxalic or sulphuric acid results in the conversion of the antibiotic to an alkaline earth metal salt thereof. The antibiotics are usually required in the form of their sodium salts and they may be converted to this form by precipitataing alkaline earth metal ions by adding an equivalent quantity of an alkali metal sulphate or more preferably by contacting the supernatant liquid with a cation exchange resin or a naturally-occurring zeolite in the sodium state.

Any Cephalosporin N remaining in the Cephalosporin C-rich fraction, can, of course, be eliminated by converting it to its penillic acid by acid hydrolysis or by a penicillinase preparation to which the Cephalosporin C is insensitive, and separating the penillic acid from the Cephalosporin C.

After having been separated from the Cephalosporin N or the penillic acid, the Cephalosporin C may be purified by any of the procedures which may be employed for the purification of Cephalosporin N. In general, these procedures are more simple to carry out owing to the stability of Cephalosporin C in acidic solutions.

If the method of purification has involved the use of ammonium acetate or ammonium formate buffers, the buffer may be removed from the resulting solution of Cephalosporin C by evaporation and sublimation in a high vacuum or by electrophoresis (using, for example, the four-compartment cell of Synge, Biochem. J. 1951, 49, 642), or by use of a suitable ion exchange resin.

Solutions of free Cephalosporin C, obtained either by use of an anion exchange column or by counter-current distribution, may be evaporated to dryness in vacuo and the Cephalosporin C passed through another anion exchange column to further purify it. The purified Cephalosporin C may be converted to the sodium salt, if desired, by dissolving in water and adjusting the pH to 6.0 with sodium hydroxide.

Solutions of the sodium salt of Cephalosporin C, obtained by one of these methods, may be decolorized, if necessary, using activated charcoal and concentrated in vacuo. Cephalosporin C sodium salt forms monoclinic crystals containing water of crystallization. It may be re-crystallized from aqueous ethanol or aqueous propanol. On drying in vacuo at room temperature, it loses water of crystallization which is rapidly regained on exposure to the laboratory air.

The invention is illustrated by the following examples of operation in accordance with preferred procedures.

EXAMPLE 1

*Solvent system.*—Water saturated with phenol (3.5 l.), phenol saturated with water (0.4 l.), carbon tetrachloride (0.4 l.), 2-4-6-trimethylpyridine (71. ml.), 10 N-$H_2SO_4$ (10 ml.) were mixed and allowed to come to equilibrium at 3° C. The reaction of the aqueous phase was pH 6.1 (glass electrode).

*Distribution.*—The 2-4-6-trimethyl pyridine salt of crude Cephalosporin N (4.4 g.), assaying 30 units/mg., was dissolved in 60 ml. of the top phase and 40 ml. of the bottom phase of the solvent system and distributed in an all-glass counter-current distribution machine at 3° C., in the manner described by Abraham, Newton and Hale (1954, Biochem. J. 58, 94) and in British patent application No. 31,589/52. At the end of the experiment ninety-five transfers had been made, giving 77 withdrawn upper layers (30 ml.) and 17 withdrawn lower layers (0–16), since a fresh increment of upper layer was no longer added to tube '0' after the 78th transfer. Cephalosporin C was located in fractions 6–16 of the withdrawn lower layers, the partition coefficient $$\left(K = \frac{\text{conc. in aqueous phase}}{\text{conc. in phenol phase}}\right)$$

of Cephalosporin C being 0.12 while that of Cephalosporin N was 0.29. Cephalosporin C was recovered as its barium salt by the method described by Abraham et al. (1954) under the heading "Determination of dry weight. System 1. (2) Second withdrawn series (phenol phase)."

EXAMPLE 2

Crude Cephalosporin N (6.9 g.), obtained on elution from alumina as described in U.S. application Serial No. 396,742, filed December 12, 1953, now Patent No. 2,883,-328, granted April 21, 1959 (British patent application No. 31,589/52) and assaying 20 units/mg., was dissolved in 110 ml. water. A sample was then removed to serve as a blank in subsequent spectroscopic measurements. 10 N-hydrochloric acid (usually about 1 ml.) was added until the reaction of the solution was between pH 2.7 and 3.0. The solution was then heated at 37° C. and samples removed at half-hourly intervals. The samples were diluted with water to give solutions containing 0.075 mg./ml., and the optical density at 240 m$\mu$ of these solutions was measured relative to a solution of the blank which has been diluted in the same way. The reaction was assumed to be complete when no further increase in optical density at 240 mμ was noted (120–180 mins.). The increase in density at 240 mμ was generally about 0.3 denstiy unit when a 1 cm. cell and a concentration of 0.075 mg./ml. were used. When the re-arrangement of the Cephalosporin N component to penillic acid was complete, the solution was freeze-dried to yield 7.0 g. of mixture.

An anion exchange resin (Amberlite XE–59), buffered with 0.2 M ammonium formate at pH 3.0–3.2, was prepared as described by Hirs, Moore and Stein (1952, J. Biol. Chem., 195, 699). A column 59 x 4 cm. was packed with the buffered resin and then 500 ml. of 0.2 M ammonium formate containing 0.5% thiodiglycol was percolated down the columns.

3.5 g. of the mixture of Cephalosporin C and Cephalosporin N penillic acid were dissolved in 30 ml. of 0.2 M buffer and the reaction of the solution adjusted so as to be 0.2 pH unit above that of the buffer in the column. This solution was applied to the column in 3 x 10 ml. portions. The flow rate of the column was adjusted so that each 10 ml. portion took 10–15 mins. to sink into the column. The solution was then washed into the column with 2 x 10 ml. of 0.2 M buffer containing 0.5% thiodiglycol. The column was then filled with the same buffer solution and connected to a constant head reservoir. The flow rate of the column was adjusted so as to collect a 20 ml. fraction every 30 mins.

Samples from every fourth fraction were taken and diluted tenfold with water. The optical densities of the diluted solutions were measured at 240 mμ and 260 mμ relative to a similarly diluted sample of the buffer solution. The Cephalosporin C was located mainly in fractions 96 to 118.

Fractions 96 to 118 were pooled and concentrated to about 60 ml. in a rotating vacuum evaporator at a temperature below 25° C. The concentrate was then evaporated to a thick syrup in a freeze-drying apparatus. The syrup was washed twice with acetone to remove the thiodiglycol. A mixture of ammonium formate and the ammonium salt of Cephalosporin C remained. The ammonium formate could be removed by either (A) high vacuum sublimation or (B) electrophoresis.

(A) The solid mass remaining after washing with acetone was dissolved in a few ml. of water and transferred to a sublimation apparatus. The sublimation is carried out as described by Hirs, Moore and Stein (1952, J. Biol. Chem. 195, 699). The residue from the sublimation was mainly the ammonium salt of Cephalosporin C, The salt was dissolved in 2–3 ml. of water and the solution was percolated through a small column (0.5 x 0.5 cm.) of activated carbon to remove pigment. When the percolate was allowed to evaporate slowly the product crystallized.

(B) The solid mass remaining after washing with acetone was dissolved in 25 ml. water and put into the neutral compartment of a four-compartment cell (Synge, 1951, Biochem. J. 49, 642). The cell was fitted with a cooling coil through which alcohol at −5° C. was pumped. The acetic acid and ammonia compartments were changed every 3 hours. The de-salting was usually completed in 12–16 hours when voltages up to 500 volts were used. The solutions from the acetic acid compartments were combined and freeze-dried The product, which consisted of the free acid of Cephalosporin C contaminated with traces of acetic acid, was freed from acetic acid by dissolving it in a small amount of water, re-precipitating it with a large excess of acetone and stirring the precipitate with dry acetone. The free acid of Cephalosporin C was then dissolved in water and neutralised with 2 N-NaOH (0.3–0.2 ml.). When allowed to evaporate slowly, the sodium salt crystallised. The crystals were freed from any non-crystalline gum by washing with 70% ethanol, and then re-crystallised from aqueous alcohol. The yield of re-crystallized material was 100 mg. At 260 mμ, $E_{1cm}^{1\%}$ was 200

EXAMPLE 3

Crude Cephalosporin N (400 mg., assaying 22 units/mg.) was dissolved in water (30 ml.) and the pH of the solution adjusted to 3.0 with 2 N-HCl. The solution was kept at 37° C. for 2.5 hours, and then passed through a column, 14 cm. long, containing 10 g. of alumina (Savory & Moore Ltd., London. For Chromatographic Analysis). The alumina had previously been stirred with enough dilute HCl to bring the pH of the supernatant liquid to equilibrium at pH 4.8.

When all the solution had been added to the alumina, a thin brown band was present at the top of the column and a faint yellow band extended below it down two-thirds of the length of the column. Only a trace of ninhydrin positive material appeared in the percolate. The column was washed with water (20 ml.), and elution then began with 0.01 N-NaOH, the eluate being collected in 5 ml. fractions. The flow rate was 1 ml. per minute. The extinction of these fractions at 240 mμ and 260 mμ was measured in a Beckman spectrophotometer. From fraction 13 the absorption at both wavelengths began to rise sharply. From fractions 13 to 17, containing Cephalosporin C, the absorption remained greater at 260 mμ than at 240 mμ. At fraction 18 there was a sudden increase in the relative absorption at 240 mμ due to the appearance in the eluate of Cephalo sporin N penillic acid. At fraction 21 a yellow pigment appeared in the eluate.

Fractions 13–17 (pH 5.0) were combined and concentrated in vacuo to 2 ml. Pigment was removed from the resulting solution by passing it through a small column of activated carbon (0.5 cm. diameter x 3 cm. high) which had previously been washed with water. On concentrating the percolate in vacuo it set to a crystalline mass of Cephalosporin C. The product weighed 33 mg. It contained some non-crystalline gum and measurement of its absorption at 260 mμ indicated the presence of 25 mg. of Cephalosporin C. The crystals were separated from the gum by stirring with a little 70% ethanol and filtered off. The crystalline product was re-crystallized from aqueous propanol.

EXAMPLE 4

*Solvent system.*—Water saturated with phenol (5 l.), phenol saturated with water (4.5 l.) and glacial acetic acid (0.45 l.) were mixed and allowed to come to equilibrium at 20° C. The reaction of the upper layer at equilibrium was pH 2.6 (glass electrode).

*Distribution.*—A mixture (7.3 g.) of Cephalosporin N penillic acid and Cephalosporin C obtained as in Example 1 was dissolved in 80 ml. of the top phase and 40 ml. of the bottom phase of the solvent system. Bottom phase (20 ml.) and top phase (40 ml.) of this solution was placed in tubes '0' and '1' of an all-glass counter-current distribution machine (Craig and Craig, 1950 Technique & Organic Chemistry, vol. 3, chapter 4). One hundred transfers of the top layer (40 ml.) were carried out using the fundamental procedure, followed by three hundred withdrawals of the upper layer (40 ml.) from tube "100".

*Analysis of fractions.*—A sample (0.2 ml.) was removed from every tenth fraction of the withdrawn series and the colour density which developed on heating with ninhydrin (0.5 ml.) was measured photometrically by the method of Moore and Stein, 1948, J. Biol. Chem. 176, 367. When the optical densities obtained in this way were plotted against the number of the fraction, a band containing Cephalosporin N penillic acid was revealed in fractions 51 to 120 and a band containing Cephalosporin C in fractions 190 to 300. The value for the partition coefficient $$K = \frac{\text{conc. in aqueous phase}}{\text{conc. in phenol phase}}$$

of Cephalosporin C calculated from the position of the peak of the band was 0.2, and that calculated for Cephalosporin N penillic acid was 0.63.

Withdrawn fractions 200–300 were pooled and concentrated to about 500 ml. (400 ml. aqueous and 100 ml. phenol layer) in a rotating vacuum evaporator. The concentrate was then placed in a separating funnel and shaken with 400 ml. of carbon tetrachloride. After the layers had separated, the carbon tetrachloride phase was discarded and the aqueous phase was extracted three times with an equal volume of benzene. The aqueous residue was concentrated to about 100 ml. in the rotating evaporator and then freeze-dried. Traces of acetic acid were removed from the product by dissolving it in a small volume of water and precipitating the Cephalosporin C (free acid) with an excess of acetone. The precipitate was washed with dry acetone.

The free acid was dissolved in a small volume of water and then neutralized with 2 N-NaOH (0.5–0.6 ml.). The sodium salt of Cephalosporin C crystallized when the neutralized solution was allowed to evaporate slowly. The crystals were washed with 70% ethanol which removed non-crystalline material. Yield 168 mg. This material was re-crystallized from aqueous propanol.

EXAMPLE 5

The starting material used in this example was a preparation of Cephalosporin N (containing some Cephalosporin C) which had been obtained by elution from alumina as described in U.S. application Serial No. 396,742, filed December 12, 1953, now Patent No. 2,883,328, granted April 21, 1959 (British patent application No. 31.589/52). Its activity was 41 units per mg. A buffer solution was made by adding N-pyridine (about 450 ml.) to 150 ml. of 2 N-sulphuric acid until the pH was 5.0 and diluting the resulting solution with water to 1800 ml.

The preparation of Cephalosporin N (280 mg.) was dissolved in 2 ml. of the buffer and added to the top of a column of Amberlite IR4B resin (150–200 mesh) 0.9 cm. in diameter and 120 cm. high which had been brought to equilibrium with the buffer before use. The column was surrounded by a jacket of running water at +5° C. Elution with the buffer was then begun, the flow rate being 3 ml. per hour. The eluate was collected in 1 ml. fractions by use of an automatic fraction collector. Each fraction was neutralised (pH 6) by collecting it in a tube containing two drops of pyridine. Antibacterial activity appeared in the eluate at fraction 48. The amount of activity rose sharply to a maximum at fraction 58 and then dropped, reaching zero at fraction 90.

Fractions 52–65, containing mainly Cephalosporin N, were pooled and 0.3 N-barium hydroxide solution was added until the pH rose to 7.6. The precipitate of barium sulphate was removed at the centrifuge and the supernatant solution was freeze-dried, yielding 100 mg. of white powder. To remove remaining traces of pyridine this was dissolved in water (1 ml.) and precipitated by the addition of 20 ml. of acetone. The resulting barium salt of Cephalosporin N assayed at 58 units per mg.

Cephalosporin C was concentrated in fractions 70–90. These fractions were combined and freed from buffer in the manner described above for fractions 52–65. The resulting barium salt was dissolved in water and the solution percolated through a column of cation exchange resin (Dowex 50) in the sodium state 1.2 cm. in diameter and 1.5 cm. high. The percolate was concentrated in vacuo to a syrup, when the sodium salt of Cephalosporin C began to crystallize. After washing with 70% aqueous ethanol to remove non-crystalline impurities, the product weighed 5.5 mg. and assayed at 10 units per mg. It showed the characteristic ultra-violet absorption spectrum of Cephalosporin C.

EXAMPLE 6

The starting material used in this example was a preparation of crude Cephalosporin N (2.3 units per mg.) obtained by evaporation of the carbon eluate described in U.S. application Serial No. 396,742 filed December 12, 1953, now Patent No. 2,883,328, granted April 21, 1959 (British patent application No. 31,589/52). The buffer was made by adding N-pyridine to 150 ml. of 2 N-sulphuric acid until the pH was 5.0 and diluting the resulting solution with water to 3.6 litres.

The crude Cephalosporin N (2 g.) was dissolved in 8 ml. of buffer and added to the top of a column of Amberlite IR4B resin (79% 40–60 mesh; 21% 60–100 mesh) 1.95 cm. in diameter and 41 cm. high surrounded by a jacket of running water at +7° C. Elution with the buffer was then begun, the flow rate being 9 ml. per hour. The eluate was collected in 3 ml. fractions, each fraction being neutralised (pH 6) by allowing it to drop into a tube containing 6 drops of pyridine. Antibacterial activity appeared in the eluate at fraction 19, rose sharply to a maximum at fraction 21 and then declined gradually to zero at fraction 100. Fractions 20–40, which contained Cephalosporin N largely free from Cephalosporin C, were pooled and freed from buffer in the manner described in the preceding example. Cephalosporin C was concentrated in fractions 40–100. These fractions were pooled and freed from buffer in the usual manner. The product weighed 70 mg. Cephalosporin N still present in this product was inactivated by keeping it in aqueous solution at pH 2.5 for 3 hours at 37° C. The activity of the remaining material, due entirely to Cephalosporin C, was 0.5 units per mg. Material obtained in this way could be used for the isolation of the crystalline sodium salt of Cephalosporin C by the procedure to be described in Example 7.

EXAMPLE 7

An aqueous solution of crude Cephalosporin E eluted from an anion exchange column and still containing some Cephalosporin N, was acidified to pH 2.5 and kept at 37° C. for 2 hours. Inactivation of Cephalosporin N was then complete. The solution was freeze-dried after its pH had been adjusted to 5.0. The product (600 mg., 0.45 unit per mg.) was added to 3 ml. of pyridine acetate buffer pH 5.0 2 M acetic acid (150 ml.), N-pyridine (250 ml.) and water (600 ml.) and some insoluble material was removed by centrifuging. The resulting clear solution (pH 5.0) was added gently in two portions to the top of a column (1.9 x 20 cm.) Amberlite IR4B (200–400 mesh). The resin was buffered at pH 5.0 with pyridine acetate by washing the acetate form of the resin with pyridine acetate buffer (prepared as above) on a filter until the inflowing and outflowing buffer had the same pH, namely 5.0.

After the solution of crude Cephalosporin C had flowed into the column, it was followed by two additions of 2 ml. pyridine acetate buffer and then the top of the column was connected to a constant head reservoir containing pyridine acetate buffer. The height of the reservoir was adjusted to give the desired rate of flow (9 ml./hour). This rate of flow was obtained when the height of buffer in the reservoir was only a few cm. above the bottom plate of the column. The effluent was collected in 3 ml. fractions every 20 minutes.

Alternate fractions were analysed by measuring the antibacterial activity against *S. typhi* of samples which had been neutralized with sodium hydroxide solution, and also by a photometric ninhydrin procedure (Moore and Stein, 1948, J. Biol. Chem. 176, 367).

Cephalosporin C was eluted in fractions 72–108. These fractions were combined and concentrated in vacuo (at 30° C., bath temperature) in a rotating evaporator. The residue was dissolved in a small volume of water and transferred to a dish and dried overnight in vacuo over KOH and $P_2O_5$, after which no smell of pyridine or acetic acid could be detected. It was then dissolved in a small volume of water (0.3 ml.) and 10 ml. of acetone was added. The precipitate was centrifuged down, stirred with a few ml. of acetone, re-centrifuged and dried in vacuo to yield an off-white coloured powder of Cephalosporin C free acid. The free acid was dissolved in water (2 ml.) to give a solution of pH 3.0, 0.1 N-NaOH (0.49 ml.) was carefully added from a burette until the pH rose to 6.5. The resulting solution of the sodium salt of Cephalosporin C was freeze-dried. The dried material was crystallized by dissolving in a small volume of water and evaporating the solution slowly. The dry crystalline material (39 mg.) was freed from non-crystalline impurities by washing with a small volume of 70% (v./v.) ethanol.

EXAMPLE 8

A solution of crude Cephalosporin C eluted from an anion exchange column and still containing some Cephalosporin N was acidified to pH 2.5. It was then kept at 37° C. for 2 hours, during which time all the Cephalosporin N activity was destroyed. The solution was then freeze-dried after adjusting its pH to 5.0 The product (4 g., 0.08 unit per mg.) was shaken with 8 ml. of pyridine acetate pH 5.0 (see Example 7). A few drops of pyridine were added to maintain the reaction of the solution at pH 5.0 After about 20 minutes the solution was centrifuged and the clear supernatant decanted. The precipitate was shaken with a further 4 ml. of buffer, re-centrifuged and the second supernatant (12 ml.) was applied in 4 x 3 ml. portions to a 2 x 42 cm. column of Amberlite IR4B (79% 40–60 mesh and 20% 60–100 mesh). The resin had been buffered with pyridine acetate buffer (pH 5.0) as described in Example 7. The solution of crude Cephalosporin C was followed by 2 x 3 ml. portions of pyridine acetate buffer and then the column was operated as described in Example 7.

Cephalosporin C was located in effluent volume 280 ml. to 500 ml. The material in effluent volume 387 ml.–443 ml. was freed from pyridine acetate buffer and precipitated with acetone as described in Example 7, yielding 18 mg. of impure Cephalosporin C free acid. The free acid was dissolved in water (2.0 ml.) and 0.1 N-NaOH (0.14 ml.) was added until the pH rose to 6.5. When this solution was evaporated slowly some of the material separated in the crystalline state. The mixture of crystalline and non-crystalline material was washed with 70% (v./v.) ethanol on a filter, yielding 2 mg. of the crystalline sodium salt of Cephalosporin C. The ethanol washings yielded 14 mg. of material having 2.5 units/mg. The remaining solution from effluent volume 280 ml.–500 ml. was estimated to contain 23 mg. of material assaying 2.5 units/mg.

It will be appreciated that the detailed examples of preferred procedures are given merely for the purpose of illustration and that various departures may be made therefrom without departing from the scope of the invention. It may be mentioned in this connection that any of solvent-systems employed in separating Cephalosporin C from either Cephalosporin N or Cephalosporin N penillic acid by counter-current distribution could be adapted to partition chromatography, one of the phases being absorbed on a support such as keiselguhr, or that they could be used in a continuous flow-solvent extraction column such as that described by Scheibel & Karr (Ind. Eng. Chem. 42, p. 1048 (1950)).

It has been mentioned above that Cephalosporin C is insensitive to penicillinase, that is to say, that it is substantially unaffected thereby. This is a most important advantageous property of the new antibiotic since it renders it useful against those micro-organisms which generate penicillinase and which are, therefore, more or less resistant to penicillin; the Cephalosporin C can act, therefore, to protect penicillin against its inactivation by such micro-organisms.

Tests have shown that Cephalosporin C is substantially unaffected by pure penicillinase produced by strains of *B. subtilis* and *B. cereus* and the following table shows the amounts of different preparations of penicillinase required to effect a 50% inactivation expressed in terms of the amount required for Cephalosporin C divided by the amount required for an equal amount of Cephalosporin N.

*Table I*

| Penicillinase | | Relative amount, C/N |
|---|---|---|
| Source | Purity | |
| *B. subtilis* (strain 749) | Crude | >100 |
| *B. cereus* (NRRL 569) | do | 5 |
| Do | Purified | 30 |
| *B. cereus* 5/B | Crystalline | 10,000 |

The lower relative amounts quoted for the less pure penicillinase preparations are probably due to the presence of impurities having a deleterious effect on the Cephalosporin C.

The effectiveness of Cephalosporin C against various micro-organisms is set out in the following table which must not, however, be regarded as setting out the full bacterial spectrum and is only illustrative of the antibiotic activity as ascertained up to the present time.

*Table II*

| Organism | Lowest concentration inhibiting growth at 24 hrs., kg./ml. |
|---|---|
| *Staph. aureus*, Heatley strain penicillin sensitive | 50–100 |
| *Staph. aureus*, Penicillin resistant | 25 |
| *Str. pyogenes* | 25 |
| *B. anthracis* | 25 |
| *N. meningitidis* | 1.6 |
| *N. gonorrhoeae* | 1.6 |
| *H. pertussie* | 1.6 |
| *H. influenzae* | 12.5 |
| *S. typhi* | 25 |
| *S. paratyphi B* | 25 |
| *S. typhimurium* | 50 |
| *V. cholerae* | 50 |
| *Bact. friedlanderi* | 50 |
| *Bact. coli* | 200 |

Figure 2:
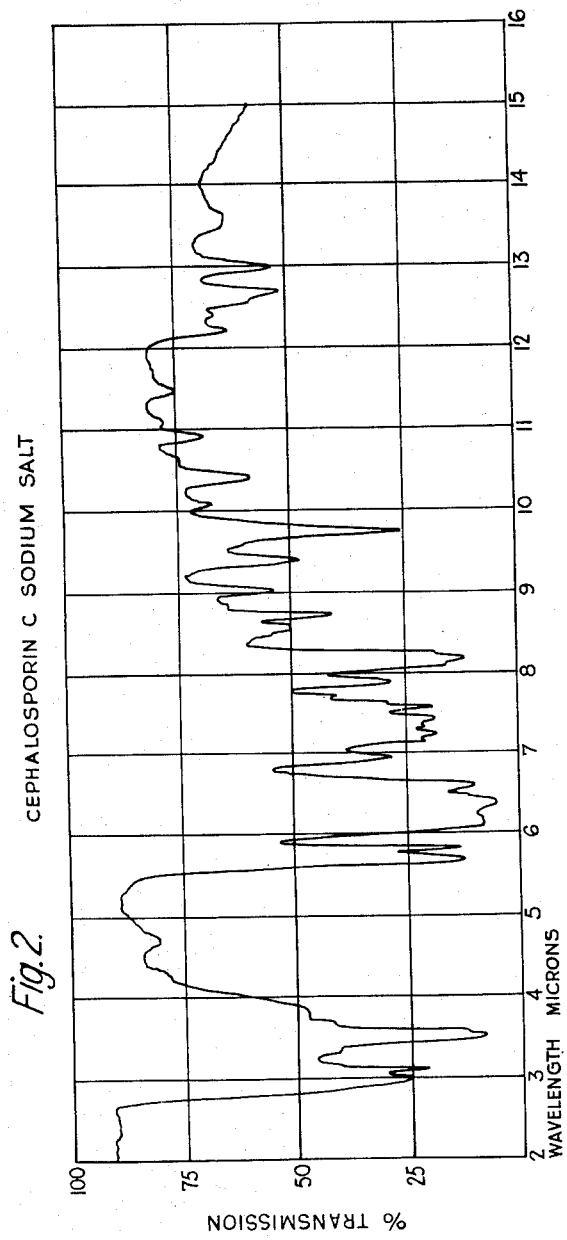

The characteristics of Cephalosporin C are illustrated in the accompanying drawings in which FIGURE 1 is the ultra-violet absorption curve and FIGURE 2 is the infra-red spectrum.

We claim:

1. A product of manufacture, the antibiotic substance, Cephalosporin C substantially free from Cephalosporin N; said Cephalosporin C containing carbon, hydrogen, oxygen, nitrogen and sulphur only and being a monoaminodicarboxylic acid effective against both gram positive and gram negative bacteria; soluble in water and almost insoluble in ethanol and ether; the sodium salt having an ultra-violet absorption maximum at 260 m$\mu$ and an infra-red spectrum showing bands at 2.94$\mu$, 3.06$\mu$, 5.61$\mu$, 5.77$\mu$, 6.05$\mu$, 6.29$\mu$, 6.57$\mu$, 7.17$\mu$ and 7.36$\mu$; stable in aqueous solution at a pH of 2.5; and having a specific rotation $[\alpha]_D^{20}$ of +103° in the form of its sodium salt.

2. A product of manufacture, a member selected from the group consisting of the alkali metal, alkaline earth metal and ammonium salts of Cephalosporin C, said member being substantially free of Cephalosporin N and of its corresponding salt; said Cephalosporin C containing carbon, hydrogen, oxygen, nitrogen and sulphur only and being a monoaminodicarboxylic acid effective against both gram positive and gram negative bacteria; soluble in water and almost insoluble in ethanol and ether; the sodium salt having an ultra-violet absorption maximum at 260 mμ and an infra-red spectrum showing bands at 2.94μ, 3.06μ, 5.61μ, 5.77μ, 6.05μ, 6.29μ, 6.57μ, 7.17μ and 7.36μ; stable in aqueous solution at a pH of 2.5; and having a specific rotation $[\alpha]_D^{20}$ of +103° in the form of its sodium salt.

3. A process for the preparation of Cephalosporin C substantially free of Cephalosporin N; said Cephalosporin C containing carbon, hydrogen, oxygen, nitrogen and sulphur only and being a monoaminodicarboxylic acid effective against both gram positive and gram negative bacteria; soluble in water and almost insoluble in ethanol and ether; the sodium salt having an ultra-violet absorption maximum at 260 mμ and an infra-red spectrum showing bands at 2.94μ, 3.06μ, 5.61μ, 5.77μ, 6.05μ, 6.29μ, 6.57μ, 7.17μ and 7.36μ; stable in aqueous solution at a pH of 2.5; and having a specific rotation $[\alpha]_D^{20}$ of +103° in the form of its sodium salt, which comprises separating it from an admixture thereof with Cephalosporin N by subjecting the said admixture to solvent extraction between water and a partially miscible inert organic solvent at a pH where Cephalosporin C is stable, said pH being less than about pH 6.

4. A process for the preparation of Cephalosporin C; said Cephalosporin C being an antibiotic substance containing carbon, hydrogen, oxygen, nitrogen and sulphur only and being a monoaminodicarboxylic acid effective against both gram positive and gram negative bacteria; soluble in water and almost insoluble in ethanol and ether; the sodium salt having an ultra-violet absorption maximum at 260 mμ and an infra-red spectrum showing bands at 2.94μ, 3.06μ, 5.61μ, 5.77μ, 6.05μ, 6.29μ, 6.57μ, 7.17μ and 7.36μ; stable in aqueous solution at a pH of 2.5; and having a specific rotation $[\alpha]_D^{20}$ of +103° in the form of its sodium salt; which comprises adjusting the pH of a solution of a mixture of Cephalosporin N and Cephalosporin C to a pH of 2.5 to 5.5 to convert the Cephalosporin N to Cephalosporin N penillic acid and thereafter recovering unchanged Cephalosporin C from the solution by subjecting the latter to solvent extraction between water and a partially miscible inert organic solvent at a pH where Cephalosporin C is stable, said pH being less than about pH 6.

5. A process for the preparation of Cephalosporin C; said Cephalosporin C being an antibiotic substance containing carbon, hydrogen, oxygen, nitrogen and sulphur only and being a monoaminodicarboxylic acid effective against both gram positive and gram negative bacteria; soluble in water and almost insoluble in ethanol and ether; the sodium salt having an ultra-violet absorption maximum at 260 mμ and an infra-red spectrum showing bands at 2.94μ, 3.06μ, 5.61μ, 5.77μ, 6.05μ, 6.29μ, 6.57μ, 7.17μ and 7.36μ; stable in aqueous solution at a pH of 2.5; and having a specific rotation $[\alpha]_D^{20}$ of +103° in the form of its sodium salt; which comprises separating it from an admixture thereof with Cephalosporin N by subjecting the said admixture to a solvent fractionation by partition between two phases formed by water and a phenol.

6. A process for the preparation of Cephalosporin C; said Cephalosporin C being an antibiotic substance containing carbon, hydrogen, oxygen, nitrogen and sulphur only and being a monoaminodicarboxylic acid effective against both gram positive and gram negative bacteria; the sodium salt having an ultra-violet absorption maximum at 260μ and an infra-red spectrum showing bands at 2.94μ, 3.06μ, 5.61μ, 5.77μ, 6.05μ, 6.29μ, 6.57μ, 7.17μ and 7.36μ; stable in aqueous solution at a pH of 2.5; and having a specific rotation $[\alpha]_D^{20}$ of +103° in the form of its sodium salt; which comprises separating it from an admixture thereof with Cephalosporin N by subjecting the said admixture to a solvent fraction by partition between two phases formed by water and a phenol, a small amount of an organic tertiary base selected from the group consisting of dialkylaniline, pyridine, lutidine, and collidine having been added to the solvent system.

7. A process for the preparation of Cephalosporin C; said Cephalosporin C being an antibiotic substance containing carbon, hydrogen, oxygen, nitrogen and sulphur only and being a monoaminodicarboxylic acid effective against both gram positive and gram negative bacteria; soluble in water and almost insoluble in ethanol and ether; the sodium salt having an ultra-violet absorption maximum at 260μ and an infra-red spectrum showing bands at 2.94μ, 3.06μ, 5.61μ, 5.77μ, 6.05μ, 6.29μ, 6.57μ, 7.17μ and 7.36μ; stable in aqueous solution at a pH of 2.5; and having a specific rotation $[\alpha]_D^{20}$ of +103° in the form of its sodium salt; which comprises separating Cephalosporin C from an admixture thereof with Cephalosporin N by subjecting the said admixture to adsorption on an anion exchange material and then separately eluting the Cephalosporin C from said anion exchange material by means of a selective eluant comprising an aqueous solution having a pH value between 2.5 and 5.0 whereby the Cephalosporin N is at least in part converted to its penillic acid and is eluted separately from the anion exchange material.

8. A process for the preparation of Cephalosporin C; said Cephalosporin C being an antibiotic substance containing carbon, hydrogen, oxygen, nitrogen and sulphur only and being a monoaminodicarboxylic acid effective against both gram positive and gram negative bacteria; soluble in water and almost insoluble in ethanol and ether; the sodium salt having an ultra-violet absorption maximum at 260 mμ and an infra-red spectrum showing bands at 2.94μ, 3.06μ, 5.61μ, 5.77μ, 6.05μ, 6.29μ, 6.57μ, 7.17μ and 7.36μ; stable in aqueous solution at a pH of 2.5; and having a specific rotation $[\alpha]_D^{20}$ of +103° in the form of its sodium salt; which comprises separating Cephalosporin C from an admixture thereof with Cephalosporin N by subjecting the said admixture to adsorption on an anion exchange material and then separately eluting the Cephalosporin C from said anion exchange material by means of a selective eluant comprising an aqueous solution having a pH between 4.9 and 8.0.

9. A process for the preparation of Cephalosporin C; said Cephalosporin C being an antibiotic substance containing carbon, hydrogen, oxygen, nitrogen and sulphur only and being a monoaminodicarboxylic acid effective against both gram positive and gram negative bacteria; soluble in water and almost insoluble in ethanol and ether; the sodium salt having an ultra-violet absorption maximum at 260 mμ and an infra-red spectrum showing bands at 2.94μ, 3.06μ, 5.61μ, 5.77μ, 6.05μ, 6.29μ, 6.57μ, 7.17μ and 7.36μ; stable in aqueous solution at a pH of 2.5; and having a specific rotation $[\alpha]_D^{20}$ of +103° in the form of its sodium salt; which comprises separating Cephalosporin C from an admixture thereof with Cephalosporin N by subjecting the said admixture to adsorption on an anion exchange material and then separately eluting the Cephalosporin C from said anion exchange material by means of a selective eluant comprising a buffered aqueous solution of a salt of pyridine, said solution having a pH of between 4.9 and 8.0.

10. A process for the preparation of Cephalosporin C; said Cephalosporin C being an antibiotic substance containing carbon, hydrogen, oxygen, nitrogen and sulphur only and being a monoaminodicarboxylic acid effective against both gram positive and gram negative bacteria; soluble in water and almost insoluble in ethanol and ether; the sodium salt having an ultra-violet absorption maximum at 260 mμ and an infra-red spectrum showing bands at 2.94μ, 3.06μ, 5.61μ, 5.77μ, 6.05μ, 6.29μ, 6.57μ, 7.17μ, and 7.36μ; stable in aqueous solution at a pH of 2.5; and having a specific rotation $[\alpha]_D^{20}$ of +103° in the form of its sodium salt; which comprises separating Cephalosporin C from an admixture thereof with Cephalosporin N by subjecting the said admixture to adsorption in an anion exchange material and then separately eluting the Cephalosporin C from said anion exchange material by means of a selective eluant comprising a buffered aqueous solution of a salt of pyridine, said solution having a pH of between 4.9 and 5.5.

11. A process for the preparation of Cephalosporin C; said Cephalosporin C being an antibiotic substance containing carbon, hydrogen, oxygen, nitrogen and sulphur only and being a monoaminodicarboxylic acid effective against both gram positive and gram negative bacteria; soluble in water and almost insoluble in ethanol and ether, the sodium salt having an ultra-violet absorption maximum at 260 m$\mu$ and an infra-red spectrum showing bands at 2.94$\mu$, 3.06$\mu$, 5.61$\mu$, 5.77$\mu$, 6.05$\mu$, 6.29$\mu$, 6.75$\mu$, 7.17$\mu$, and 7.36$\mu$; stable in aqueous solution at a pH of 2.5; and having a specific rotation $[\alpha]_D^{20}$ of $+103°$ in the form of its sodium salt; which comprises separating Cephalosporin C from an admixture thereof with Cephalosporin N by subjecting the said admixture to adsorption in an anion exchange material and then separately eluting the Cephalosporin C from said anion exchange material by means of a selective eluant comprising a buffered aqueous solution of a salt of pyridine, said solution having a pH of between 4.9 and 5.5 and being prepared by neutralizing pyridine with acetic acid.

12. In a process for the isolation of Cephalosporin C; said Cephalosporin C being an antibiotic substance containing carbon, hydrogen, oxygen, nitrogen and sulphur only and being a monoaminodicarboxylic acid effective against both gram positive and gram negative bacteria; soluble in water and almost insoluble in ethanol and ethers; the sodium salt having an ultra-violet absorption maximum at 260 m$\mu$ and an infra-red spectrum showing bands at 2.94$\mu$, 3.06$\mu$, 5.61$\mu$, 5.77$\mu$, 6.05$\mu$, 6.29$\mu$, 6.57$\mu$, 7.17$\mu$ and 7.36$\mu$; stable in aqueous solution at a pH of 2.5; and having a specific rotation $[\alpha]_D^{20}$ of $+103°$ in the form of its sodium salt; the improvement which comprises destroying Cephalosporin N in an admixture thereof with Cephalosporin C in aqueous solution by heating at a pH between 2.5 and 4.5.

13. A process for the preparation of Cephalosporin C substantially free of Cephalosporin N; said Cephalosporin C containing carbon, hydrogen, oxygen, nitrogen and sulphur only and being a monoaminodicarboxylic acid effective against both gram positive and gram negative bacteria; soluble in water and almost insoluble in ethanol and ether; the sodium salt having an ultra-violet absorption maximum at 260 m$\mu$ and an infra-red spectrum showing bands at 2.94$\mu$, 3.06$\mu$, 5.61$\mu$, 5.77$\mu$, 6.05$\mu$, 6.29$\mu$, 6.57$\mu$, 7.17$\mu$ and 7.36$\mu$; stable in aqueous solution at a pH of 2.5; and having a specific rotation $[\alpha]_D^{20}$ of $+103°$ in the form of its sodium salt, which comprises separating Cephalosporin C from an admixture thereof with Cephalosporin N by subjecting the said admixture to adsorption of an anion exchange material and then separately eluting the Cephalosporin C from said anion exchange material by means of a selective eluant therefor.

References Cited in the file of this patent

UNITED STATES PATENTS

| Number | Name | Date |
|---|---|---|
| 2,658,018 | Gottshall et al. | Nov. 3, 1953 |
| 2,674,561 | Mayer | Apr. 6, 1954 |
| 2,741,604 | Goldsmith et al. | Apr. 10, 1956 |
| 2,776,279 | Muckter et al. | Jan. 1, 1957 |
| 2,789,939 | Kita | Apr. 23, 1957 |

OTHER REFERENCES

Abraham et al.: Nature, vol. 171, Feb. 21, 1953, p. 343.
Newton et al.: Nature, vol. 172, Aug. 29, 1953, p. 395.
Abraham et al.: Biochem. J., vol. 58, September 1954, pp. 94–111.
Newton et al.: Nature, vol. 175 (1955), p. 549.
Abraham et al.: Nature, vol. 176, Sept. 17, 1955, p. 551.
Newton et al.: Biochem. J., vol. 62 (1956), pp. 652–8.